July 8, 1941. H. J. HORN 2,248,707
VEHICLE WHEEL
Filed July 8, 1937

INVENTOR.
HARRY J. HORN
BY
Carroll R. Taber
ATTORNEY.

Patented July 8, 1941

2,248,707

UNITED STATES PATENT OFFICE 2,248,707

VEHICLE WHEEL

Harry J. Horn, Lansing, Mich., assignor to Motor Wheel Corporation, Lansing, Mich., a corporation of Michigan Application July 8, 1937, Serial No. 152,483

1 Claim. (Cl. 301—6)

This invention relates to vehicle wheels, and more particularly to a means for ventilating wheels of the disk type.

In vehicle wheels of the disk type it is difficult to ventilate the interior thereof in such a manner that the heat generated in the brake drum by application of the brakes can be readily dissipated, as there is usually no provision for the circulation of air through the wheel.

An object of my invention, therefore, is to provide a means for ventilating the interior of a wheel and cooling the brake drum by either exhausting the air from the interior or by scooping air into the interior thereof.

A further object of my invention is to provide a device which may be used to enhance the appearance of the outer surface of the wheel body.

Other objects of the invention will appear in the following specification, taken in connection with the accompanying drawing, wherein like numerals designate corresponding parts in the several views.

Figure 1:
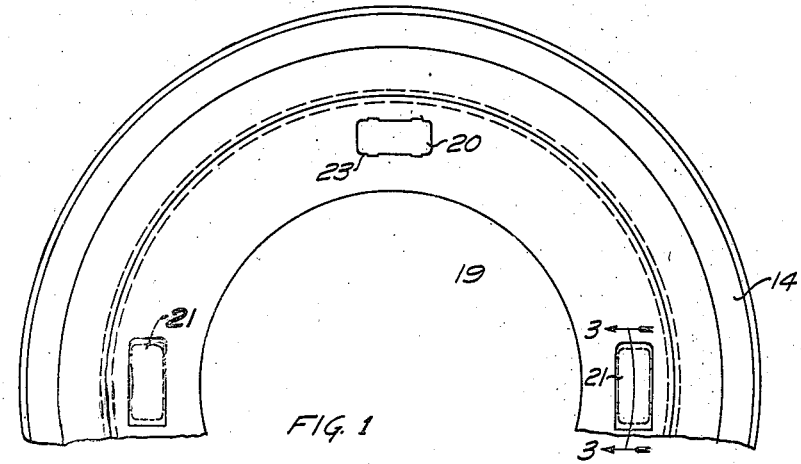
Figure 1 is a fragmentary front elevational view of a wheel having my invention applied thereto.
Figure 4:
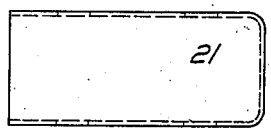
Figures 4, 5 and 6 are respectively views in plan, side elevation, and end elevation of my ventilating device itself prior to attachment to the wheel.

Referring now to the drawing, the numeral 10 designates a portion of a vehicle wheel hub shown in dotted lines, to which a brake drum 11 is secured.

A wheel body 12 is removably attached to the outboard side of the hub flange 10 by means of cap screws 13, and the outer peripheral edge of the wheel body 12 is flanged axially at 13 to form a seat for a rim 14, to which it is attached by rivets 15.

The central portion of the wheel body is dished axially inwardly at 16, and mounted at the base of this dished portion are a plurality of circumferentially spaced spring clips 17 riveted to the wheel body by rivets 18. The hub cap 19 is sprung over the clips 17 to removably secure it to the wheel.

In the outer face of the wheel body are four apertures 20, one of which is not shown, arranged concentrically about the hub axis. The apertures shown are generally rectangular, with notches 23 at each side. It will, of course, be readily apparent that the shape and number of the apertures 20 may be varied at will, depending only on the necessary load carrying capacity of the wheel.

Figure 5:
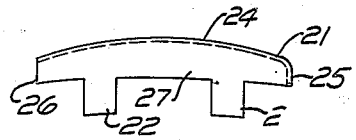
Figure 6:
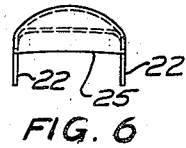
Figure 2:
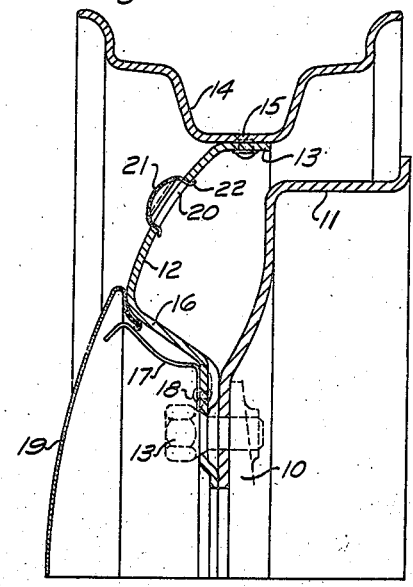
Figure 2 is a fragmentary vertical sectional view taken approximately on a vertical line through the axis of the wheel.
Figure 3:
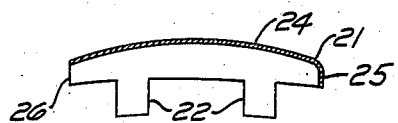
Figure 3 is a cross-section of my improved ventilator, taken on substantially the line 3—3 of Figure 1.

The ventilators are shaped as shown in Figures 3, 4, 5 and 6. Each ventilator 21 consists of an outer curved face 24, with depending side walls 27 and a depending end wall 25. The opposite end 26 of each ventilator has no wall, but is left open as shown in Figures 3 and 5. Extending from each side wall are two tongues 22 which fit into the notches 23 in the edges of the apertures 20, to secure the ventilators in place on the wheel body.

Figure 8:
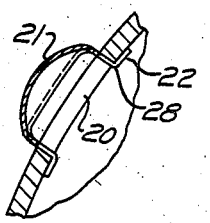
Figure 8 is a sectional view on an enlarged scale of the ventilator of Figures 1 to 6 in place on the wheel.

The ventilator may be placed on the wheel body by inserting the tongues 22 in the notches 23, when the side walls 27 and end wall 25 will overlie the wheel body at the edges of the aperture. After the ventilator is in place, the tongues 22 are bent at 28 (Figure 8) against the inner face of the wheel body 12 to secure the ventilator in place.

Figure 7:
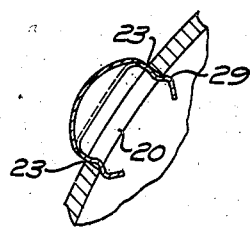
Figure 7 is a sectional view of a modification of my ventilator shown in place on the wheel and showing the use of snap lugs for attachment to the wheel.

An alternative method of attachment of the ventilators is shown in Figure 7. In this construction the tongues are bent reversely to form humps 29 which normally are spaced farther apart than the width of the aperture. Then when the ventilator is pressed toward the wheel the tongues are sprung toward each other until the humps 29 pass the walls of the aperture at 23, at which point they snap back to their original position, thereby removably securing the ventilators to the wheel body.

The apertures 20 in the wheel body are symmetrical and the tongues 22 on the ventilator are also symmetrically arranged so that they may be inserted in the aperture with the open end of the ventilator in either direction. When the ventilator is inserted so that the open end is forward in the direction of rotation of the wheel, the ventilator will act as a scoop, thereby directing air into the interior and over the brake drum 11 as the wheel rotates. When mounted in the reverse direction, or in other words, with the open end rearwardly arranged with respect to the direction of rotation of the wheel, the ventilator will produce a partial vacuum at its open end and thus act to exhaust the air from the interior of the wheel, drawing it over the brake drum from the interior of the wheel.

The ventilators may be decorated in any desired manner, in order to improve the appearance of the wheel. They may be plated with some metal, such as chromium or nickel, or they may be painted with various contrasting colors, thereby enhancing the wheel's appearance. In addition, they may be embossed with any suitable name, such as the name of the manufacturer of the vehicle.

Ordinarily the ventilators will be made of springy metal, so that they may be bent as above outlined in order to hold them in place on the wheel, but it is also possible to make them of some plastic composition or other suitable material.

It will thus be seen that I have provided an efficient type of ventilator for a solid disk wheel, which may be readily removed or inserted in place on the wheel, and one that may be reversed end for end in order to cause the air to flow either in or out over the interior of the wheel.

It will, of course, be apparent that my invention is susceptible of variations other than those specifically illustrated, and the scope of the invention is therefore to be limited only by the terms of the appended claim.

I claim:

A vehicle wheel comprising, in combination, a wheel body of the pressed metal disk type having an opening therethrough, and a cover for a portion of said opening, said cover including an imperforate outer wall overlying at least a portion of the opening and having a peripheral flange extending toward the wheel and partially surrounding said opening, whereby to form with said opening a passage for air through said wheel, said cover having means thereon for removably attaching same to the wheel body and being adapted for attachment to said wheel body in either of two angularly opposed positions, said means comprising a plurality of tongues integral with said peripheral flange and engaging the wheel body at the edges of said opening, said cover being adapted to induce the flow of air through said opening in either position in which said cover is mounted.

HARRY J. HORN.